US006199135B1

(12) United States Patent
Maahs et al.

(10) Patent No.: US 6,199,135 B1
(45) Date of Patent: Mar. 6, 2001

(54) SOURCE SYNCHRONOUS TRANSFER SCHEME FOR A HIGH SPEED MEMORY INTERFACE

(75) Inventors: David A. Maahs, St. Paul; Robert M. Malek, White Bear Lake; Mitchell A. Bauman, Circle Pines, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/097,287

(22) Filed: Jun. 12, 1998

(51) Int. Cl.[7] .............................. G06F 13/42; G06F 1/04; G06F 13/10; G06F 9/455; H03K 19/0175
(52) U.S. Cl. ...................... 710/129; 710/104; 710/105; 710/107; 710/117; 710/123; 710/241; 710/70; 710/36; 710/38; 710/113; 370/402; 709/232; 713/400
(58) Field of Search ........................... 395/880, 200.63, 395/849, 881, 878, 200.1, 200, 729, 325; 327/293; 340/347; 364/200; 710/70, 113, 129; 711/119; 708/819; 365/230.02; 333/165; 703/14

(56) References Cited

U.S. PATENT DOCUMENTS

| 3,798,617 | * | 3/1974 | Varadi et al. ................... 365/230.02 |
| 4,243,958 | * | 1/1981 | Wilde ................................... 333/165 |
| 4,264,983 | * | 4/1981 | Miller ................................. 708/819 |
| 4,595,911 | | 6/1986 | Kregness et al. .................... 341/78 |
| 4,881,165 | | 11/1989 | Sager et al. ......................... 713/400 |
| 5,195,185 | | 3/1993 | Marenin ............................. 710/123 |
| 5,202,966 | | 4/1993 | Woodson ............................ 710/117 |
| 5,255,375 | | 10/1993 | Crook et al. ........................ 710/105 |
| 5,524,112 | * | 6/1996 | Azuma et al. ...................... 370/402 |
| 5,630,100 | * | 5/1997 | Ganapathy et al. ................ 395/500 |
| 5,634,060 | | 5/1997 | Jennings ............................. 710/241 |
| 5,723,995 | | 3/1998 | Mozdzen et al. .................... 327/293 |
| 5,768,529 | | 6/1998 | Mikel et al. ......................... 709/232 |
| 5,898,886 | * | 4/1999 | Hewitt ................................. 710/70 |
| 5,911,051 | * | 6/1999 | Carson et al. ...................... 710/107 |
| 5,919,254 | * | 7/1999 | Pawlowski et al. ................ 710/104 |
| 5,919,265 | * | 7/1999 | Nishtala et al. .................... 713/400 |
| 6,005,412 | * | 12/1999 | Ranjan et al. ....................... 326/63 |
| 6,006,291 | * | 12/1999 | Rasmussen et al. ................ 710/38 |
| 6,049,845 | * | 4/2000 | Bauman et al. .................... 710/113 |
| 6,052,760 | * | 4/2000 | Bauman et al. .................... 711/119 |

OTHER PUBLICATIONS

Chow et al. "A Discipline for Constructing Multiphase Communication Protocols", ACM Trans. Compu. Syst. 3, 4 (Nov. 1985), pp. 315–343.*
Shenoy et al. "Resynthesis of Multi–Phase Pipelines", Proceedings of the 30th International on Design Automation Conference, 1993, pp. 490–496.*
Accelerated Graphics Port Interface Specification, Revision 2.0, Intel Corporation, pp. 75–77, 179–180, May 4, 1998.*

* cited by examiner

Primary Examiner—Thomas C. Lee
Assistant Examiner—Katharina Schuster
(74) Attorney, Agent, or Firm—Charles A. Johnson; Mark T. Starr; Nawrocki, Rooney & Sivertson, P.A.

(57) ABSTRACT

Data transfer scheme wherein data transfer rates can be effectively doubled with no increase in the clock speed of the interface. This is accomplished by allowing more than one data transfer to occur on a single clock cycle. This transfer scheme increases the transfer rate of the interface by multiplexing two data groups on the same interface. These data groups are transmitted from a source phase latch at approximately the same time as two strobe signals which have low skew with respect to the data. The master and slave strobe signals are logically combined to create an even latch enable signal and an odd latch enable signal that are used to latch and de-multiplex the multiplexed data groups at a receiving end of a pair of flow-though source synchronous latches.

40 Claims, 12 Drawing Sheets

DIB TO TCM

FIG. 6 DIB TO TCM

TCM TO DIB

FIG. 8 — TCM TO DIB TIMING DIAGRAM

TCM TO CLUSTER

CLUSTER TO TCM

SOURCE SYNCHRONOUS TRANSFER SCHEME FOR A HIGH SPEED MEMORY INTERFACE

CROSS REFERENCE TO CO-PENDING APPLICATIONS

The present application is related to U.S. patent application Ser. No. 09/096,629, filed Jun. 12, 1998, entitled "Bi-Directional Interface Distributed Control Mechanism", and U.S. patent application Ser. No. 09/026,842, filed Jun. 12, 1998, entitled "Queuing Architecture and Control System for Data Processing System Having Independently-Operative Data and Address Interfaces", both of which are assigned to the assignee of the present invention and incorporated herein by reference.

BACKGROUND OF THE INVENTION

1. Field of the Invention

The present invention relates to storage interfaces in symmetrical multiprocessor systems, and more specifically, to a source synchronous transfer scheme that may increase the data rate over normal synchronous transfer methods.

2. Description of the Prior Art

In most general purpose, stored program, digital computers, it is desirable to have shared resources contained therein. Each of the shared resources may be designed to service a number of users. Possible shared resources may include a bus, a memory, a processor, or any other element within the computer system. The concept of utilizing shared resources has been used for several years to decrease the number of components within a computer system thereby increasing the cost effectiveness of the system. The use of shared resources also reduces the overall size and power requirements of the computer system.

Although these benefits can be substantial, shared resources may reduce the band pass of a system if not carefully used and designed. One reason for this is that only one of the users may use the shared resource at any given time. That is, the users must "share" the resource. Consistent therewith, computer designers must weigh the advantage of using a shared resource against the band pass limiting effect inherent therein. To increase the number of applications for shared resources and thus to take advantage of the benefits attributable thereto, computer designers have attempted to increase the band pass of shared resource designs.

One method for increasing the overall band pass of a shared resource design is to utilize priority schemes. For example, in a typical system, a number of processors may communicate with one another across a shared bi-directional bus. However, only one of the processors may use the shared bus at any given time. Therefore, the computer system must employ a mechanism for ensuring that only one processor has access to the shared bus at any given time while blocking access of the remaining processors.

Often, one or more of the processors may have a greater need to access the shared bus. One reason for this may be that one or more of the processors may be in the critical path of the computer system. If a processor is in the critical path of a computer system and it is not allowed to access the shared resource, the band pass of the entire computer system may suffer.

In a typical data processing system, there is a maximum of one data transfer per clock cycle. That is, data is typically transferred from a sending device to a receiving device on a leading or trailing edge of a system clock pulse. Thus, there is a direct relationship between the clock cycle time and the data transfer rate. Accordingly, data transfer rates are typically limited by the maximum clock rate of the system.

Several potential problems are encountered when increasing the maximum clock rate of the system. Transfers of data will typically occur between a transmitting and receiving component through two sets of latches. In order for the data to transfer successfully between the transmitting and receiving component, the data must traverse the path from the transmitting component latch to the receiving component latch within a set period of time, typically one clock cycle. Additionally the receiving latch requires the data to reach the input of the latch a certain period of time before the clock cycle occurs (typically referred to as "set-up" and "hold" times). Thus, timing constraints on the data transmittal path become more acute as the transfer clock rates are increased.

SUMMARY OF THE INVENTION

The present invention overcomes many of the disadvantages associated with the prior art by providing a source synchronous transfer scheme between system components which enhances the transfer rate through the use of multi-phase data transfers within single clock cycle. Simply stated, the present invention allows more than one data transfer to occur on a single clock cycle. Thus, under the transfer scheme disclosed by the present invention, data transfer rates can be effectively doubled with no increase in the clock speed of the interface.

The transfer scheme of the present invention increases the transfer rate of the interface by multiplexing two data groups on the same interface. These data groups are transmitted from a source phase latch at approximately the same time as two strobe signals (a master and a slave) which have low skew with respect to the data. The master and slave strobe signals are logically combined to create an even latch enable signal and an odd latch enable signal that are used to latch and de-multiplex the multiplexed data groups at a receiving end of a pair of flow-though source synchronous latches.

The leading edge of the master strobe signal generates the leading edge of the even source synchronous latch enable signal, and the leading edge of the slave strobe signal generates the trailing edge of the even source synchronous latch enable signal. Similarly, the trailing edge of the master strobe signal generates the leading edge of the odd source synchronous latch enable signal, and the trailing edge of the slave strobe signal generates the trailing edge of the odd source synchronous latch enable signal. Using the leading and trailing edges of the latch enable signals to generate a clock source for the source synchronous latches at the receiving end ensures that the clocking signals are insensitive to signal attenuation caused by the transmission environment.

In a preferred embodiment, a data transmission from a source phase latch to a destination phase latch may be completed in one phase separation plus a clock pulse width. Clocking for the master and slave strobe signals will share common clock splitters with the data to minimize skew.

In a preferred embodiment, a Unisys hardware platform utilizes the source synchronous interface design of the present invention at four interface locations within the computer system. The interface of the present invention is used between the Main Storage Unit (MSU) and the Third Level Cache Memory Interface (TCM). This MI interface operates at a 100 MHz clock and 200 MHz data rate. The interface of the present invention is also used between the Third Level Cache Memory Interface Unit (TCM) and a Third Level Cache Module (TCT). This MT interface operate at a 133 MHz clock rate and a 266 MHz data rate. The interface of the present invention again is used between the Third Level Cache Memory Interface Unit (TCM) and the Direct I/O Bridge Unit (DIB). This MIO interface operates at a 50 Mhz clock and 100 Mhz data rate. Finally, the interface of the present invention is used between the Third Level Cache Memory Interface (TCM) and the cluster. This MIO interface operates at a 100 Mhz clock and 200 Mhz data rate.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1A:
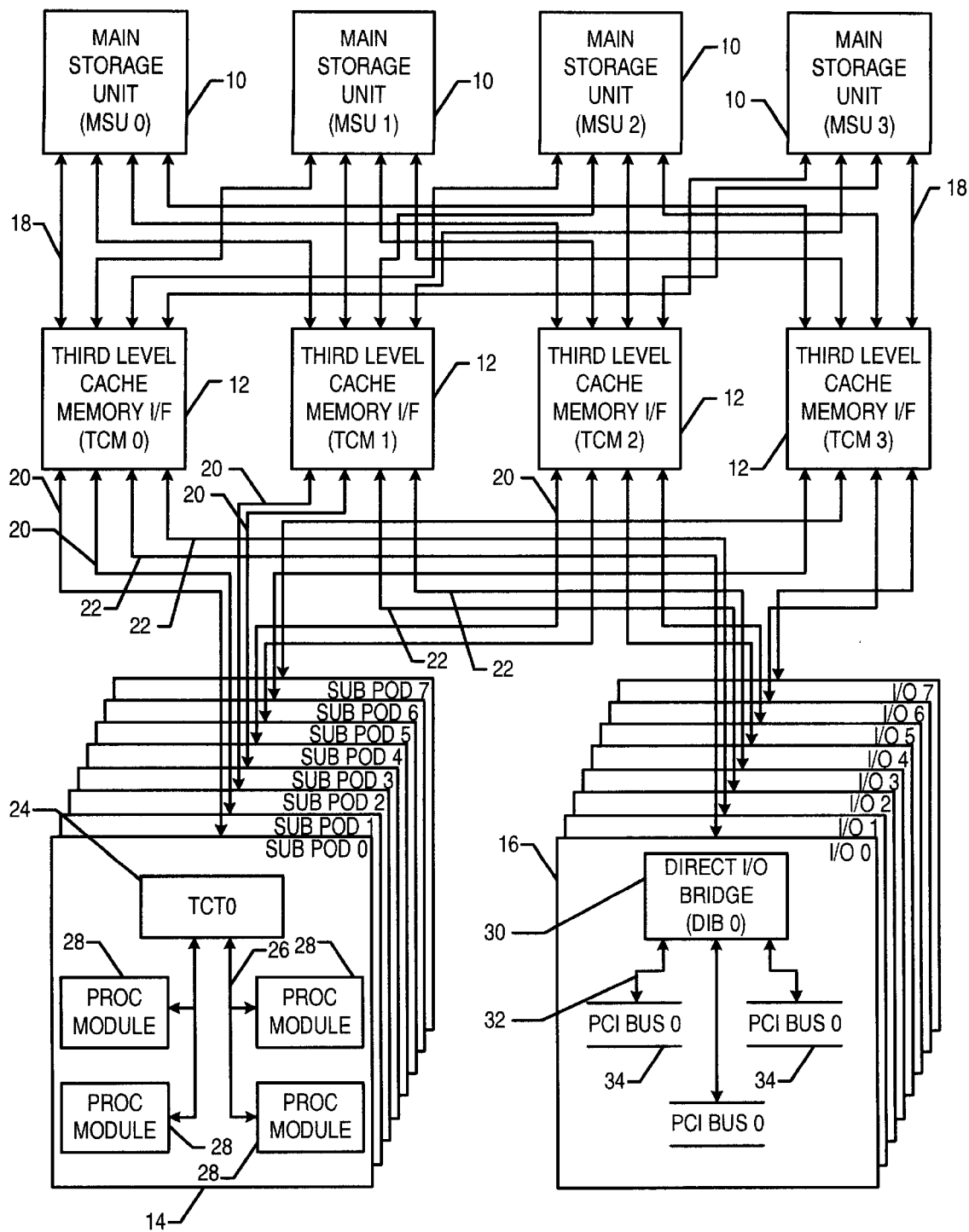
FIG. 1A illustrates a block diagram of a System hardware platform available from Unisys Corporation.

FIG. 1A illustrates a block diagram of a system hardware platform available from Unisys Corporation. The platform consists of up to 4 Main Storage Units called MSUs 10, up to 4 Third Level Cache Memory Interface entities called TCMs 12, up to 8 units called Sub PODs 14, and up to 8 units called I/O subsystems (I/O) 16.

The Main Storage Unit (MSU) 10 is a directory based coherent memory system designed to support the memory consistency models of A-Series, 2200, and UNIX/NT systems, all available commercially from Unisys Corporation. The MSU 10 is capable of supporting 1x–32x processor systems with a storage capacity of up to 32 gigabytes and a system memory bandpass exceeding 20 gigabytes/second. The MSU 10 operates in a symmetrical processing environment (SMP).

Each MSU 10 is capable of storing up to 8 gigabytes of information for a total system capacity of 32 gigabytes. Also, each MSU 10 contains 16 expansion units with each expansion unit having 3 possible capacities: 128 megabytes, 256 megabytes, and 512 megabytes. Each MSU 10 has 16 semi-independent banks that share 4 double wide data busses and 8 unidirectional address busses to the synchronous dynamic random access memory (SDRAM) devices.

The system cache coherency is maintained by a central directory of all the cache lines, which is located in the MSU 10. The MSU 10 has single bit error correction and multiple bit error detection on both the data and directory storage.

Each MSU 10 is connected to each TCM 12 via a point-to-point bi-directional interface 18 that has separate address/function and data busses. The data width is 64 bits or 8 bytes for each data interface 18, while the address/function bus width is 21 bits. A source synchronous data transfer mechanism is used with the data bus that provides for a transfer rate of 200 mega transfers per second. All data information is transferred in 64 byte packets known as cache lines. It takes 4 clock cycles to transfer a cache line from the MSU 10 to the TCM 12. Therefore, each MSU/TCM interface 18 can support a peak rate of 1.6 gigabytes/sec. With a maximum of 16 such interfaces, the total peak bandwidth is 25.6 gigabytes/sec. The address/function bus portion of the interface 18 operates at a 100 mega transfers per second rate and two transfers are necessary to transfer the full address.

Figure 1B:
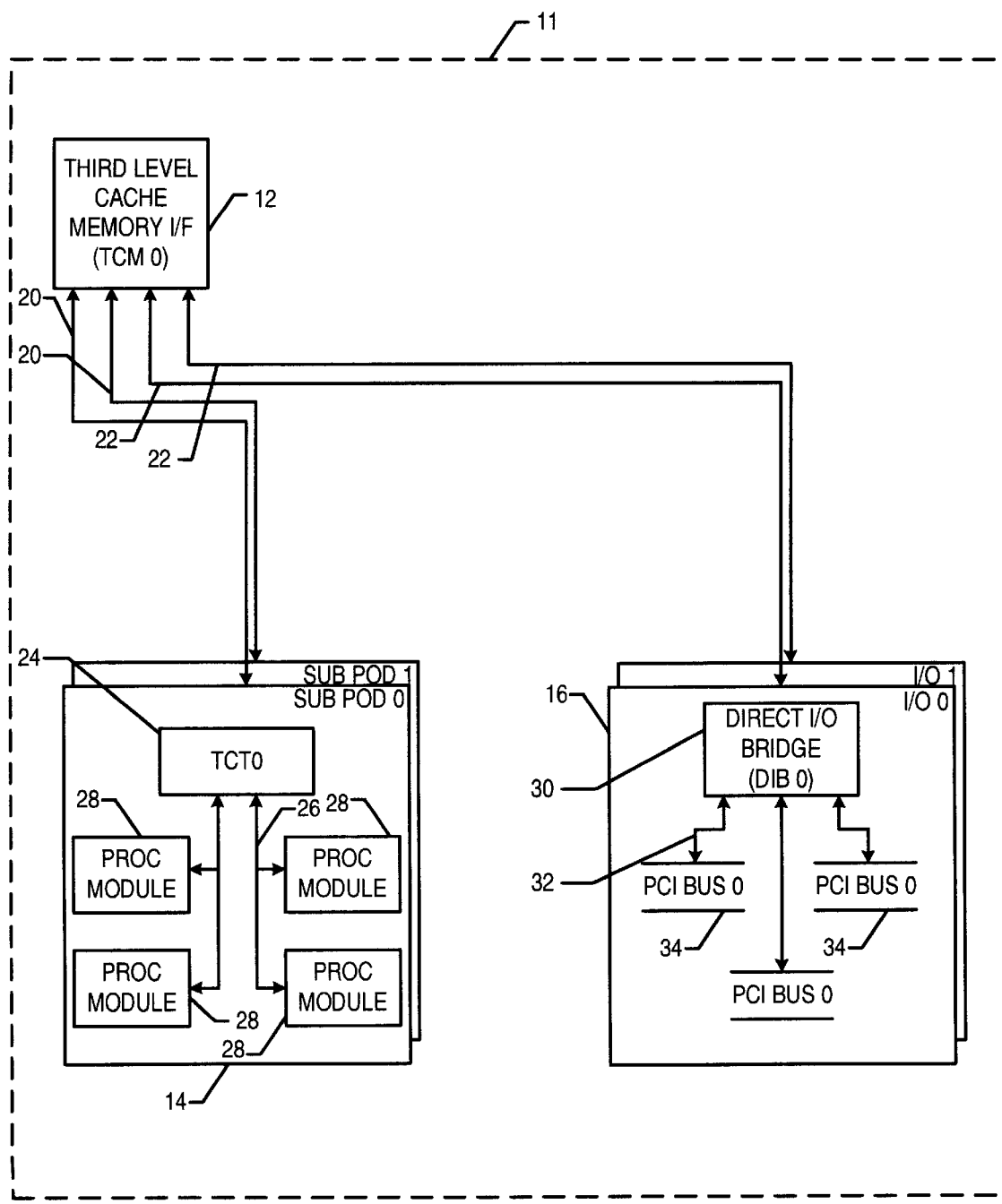
FIG. 1B is a block diagram representation of the conglomerate of a TCM, two Sub PODs, and two I/O modules (known hereinafter as a POD) within the System hardware platform.

The TCM Module 12 is basically a cross bar that connects two Sub PODs 14 and two I/O module requesters 16 to the four MSU servers 10. The conglomerate of the TCM 12, two Sub PODs 14, and the two I/O modules 16 is referred to as a POD 11 (as illustrated in FIG. 1B). The TCMs 12 are connected to the Sub PODs 14 via a point-to-point bi-directional interface 20 that has separate address/function and data busses similar to the TCM-to-MSU interface 18, and with equivalent transfer rates. However, the I/O (DIB) to TCM interface 22 has a similar logical interface as the TCM-to-MSU interface 18, but operates at half the transfer rate.

Each Sub POD 14 consists of a Third Level Cache Module (TCT) 24 and two Processor bus interfaces 26. Each Processor bus interface 26 will support up to two Processor modules 28. These modules 28 will either contain a IA-32 style, a IA-64 style, a 2200 style, or an A series style processor.

Each I/O subsystem 16 consists of a DIB module 30 that interconnects through interface 22 to the TCM module 12 with up to three PCI busses 34. Each PCI bus 34 can support up to 4 PCI channel modules for a total of 96 for the maximum system configuration.

Figure 2:
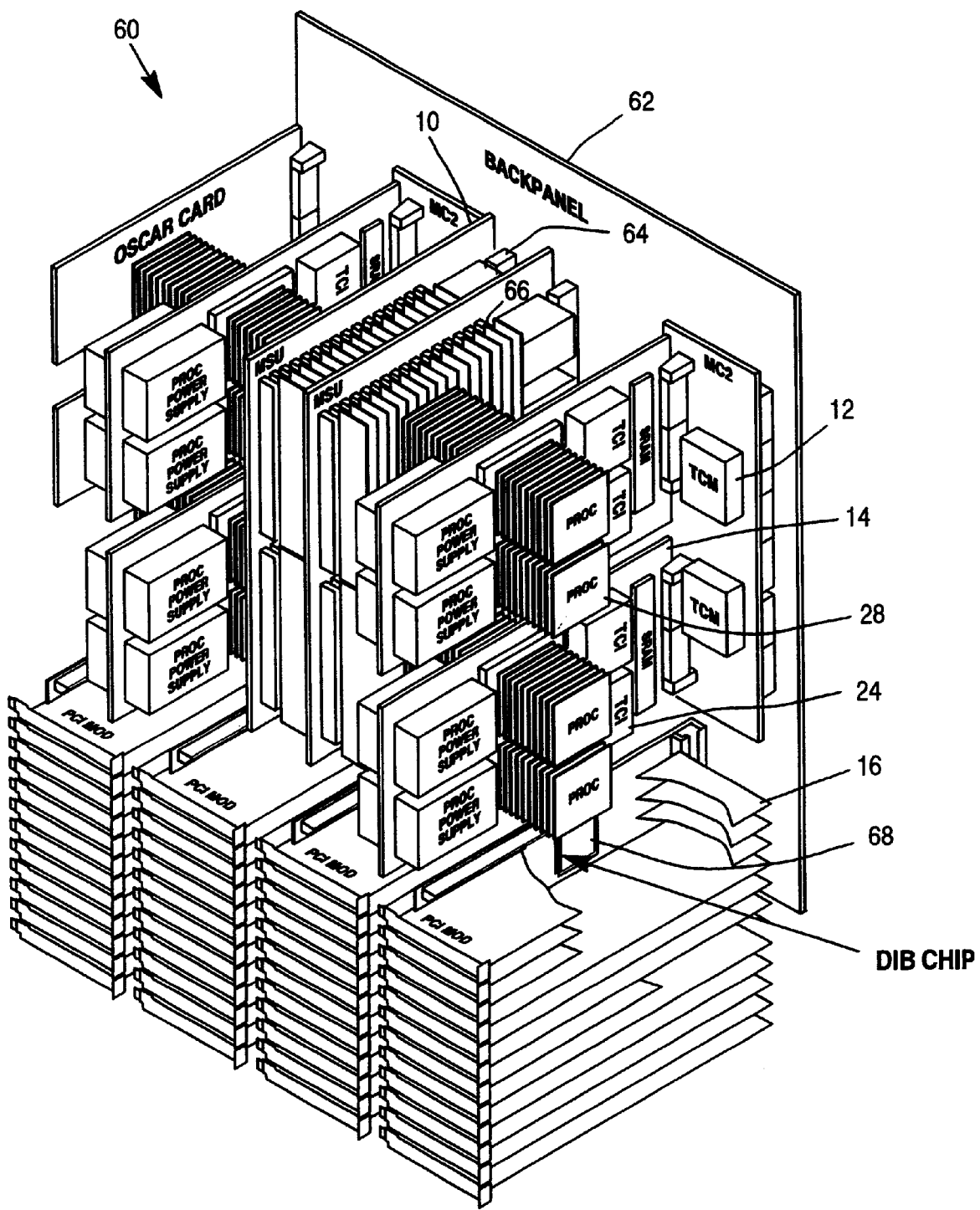
FIG. 2 is a three dimensional physical representation of the Unisys Hardware Platform.

FIG. 2 is a three dimensional physical representation of a Unisys Hardware Platform 60. Up to 4 Main Storage Units (MSUs) 10 are attached to the backpanel 62 of the Hardware Platform 60 through connector 64. Each MSU 10 contains 16 memory expansion units 66, with each expansion unit having 3 possible capacities: 128 Megabytes, 256 Megabytes, and 512 Megabytes.

Each TCM module 12 acts as a cross bar that connects two Sub PODs 14 and two I/O module requesters 16 to the MSU servers via the backpanel 62.

Each Sub POD 14 has a Third Level Cache Module (TCT) 24, and up to 4 processor modules 28. Each I/O subsystem 16 consists of a DIB Module 68 that interconnects the TCM module 12 with up to three PCI busses.

Figure 3:
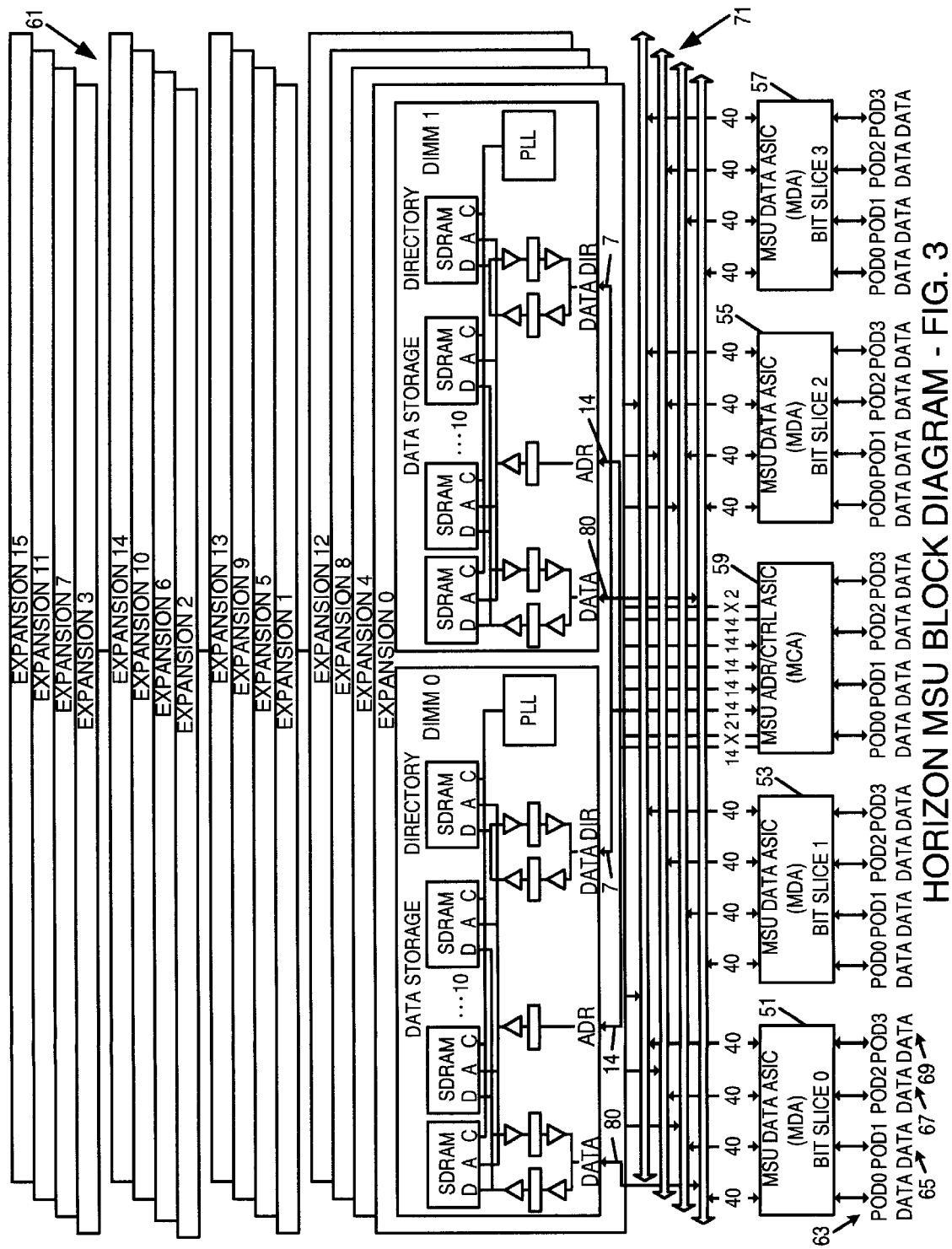
FIG. 3 illustrates an MSU block diagram.

FIG. 3 illustrates an MSU block diagram. The MSU contains 5 Application Specific Integrated Circuits (ASICs) 51, 53, 55, 57 and 59 and up to 16 expansion modules 61. The 5 ASICs consist of two types, the MSU Data ASIC (MDA) 51, 53, 55 and 57 and the MSU address control ASIC (MCA) 59. The four MDA ASICs 51, 53, 55 and 57 act as a cross bar interconnect among the four POD data interfaces 63, 65, 67 and 69 and the 4 data buses to the DIMMs 71. The four POD interfaces 63, 65, 67 and 69 are bit sliced amongst the four MDA ASICs 51, 53, 55 and 57. Each POD interface is bi-directional, and operates at a 200 Mega-transfer/second rates using a source synchronous clocking scheme. The data buses 71 between the MDA ASICs 51, 53, 55, and 57 and the Expansion modules 61 are also bi-directional, and operate at a 100 Mega-transfer/sec. rate.

The MCA ASIC 59 contains all the address and control logic. There are bi-directional address and control interfaces between the MCA 59 and the four PODs. Four addresses, one from each POD, may be routed in a parallel fashion to the MCA ASIC 59. The MCA ASIC routes and queues up these addresses to 16 semi-independent banks. They are semi-independent because 16 sets of SDRAM requests can be outstanding and overlapping in different phases at one time. However, the 16 banks share 8 independent address busses and 4 sets of Directory data busses. When all considered, there are a total of 4 totally independent logic/control areas in the MCA, of which each area can handle up to 4 requests, each in different phases of operation, for a total of 16 requests outstanding to the SDRAM storage.

Figure 4:
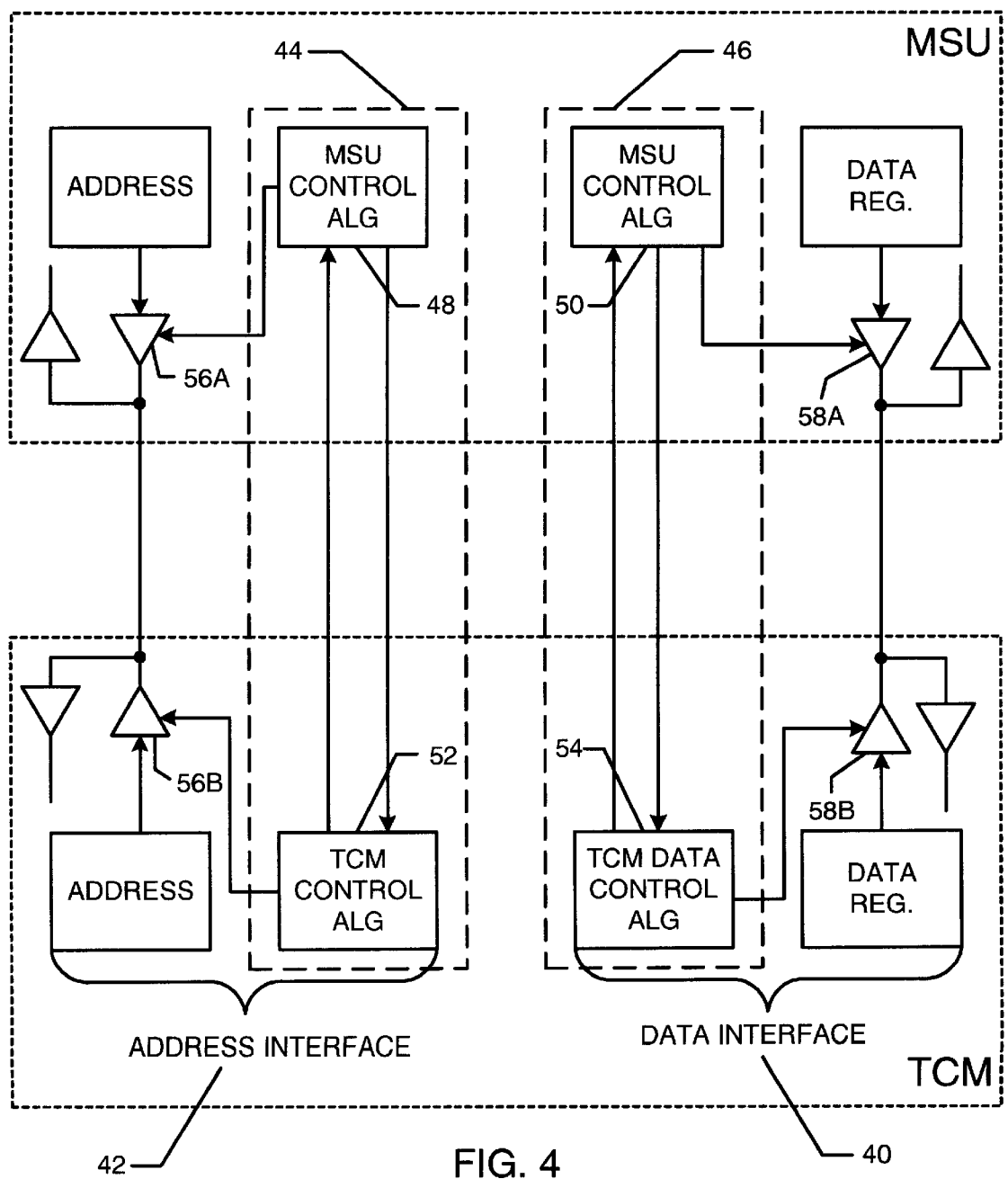
FIG. 4 further illustrates a set of bi-directional, source synchronous data and function/address interfaces between a POD and an MSU in the Unisys hardware platform.

FIG. 4 further illustrates a set of bi-directional, source synchronous data 40 and a set of bi-directional, synchronous function/address 42 interfaces between a POD 11 and an MSU 10 in the hardware platform. These interfaces 40 and 42 are used to provide the communication paths between each of the PODs 11 and each of the MSUs 10. The interfaces are used by the PODs 11 to make memory requests to the MSUs 10 and are used by the MSUs 10 to subsequently return memory data to the PODs 11. The MSUs 10 also must provide addresses to the PODs 11 to facilitate the return operations that force one of the PODs 11 to return updated copies of data that is requested by another POD 11.

Within a set of these interfaces 40 and 42, the data 40 and address 42 interfaces operate independently (there is no rigid timing relationship between the transfer of data and the accompanying address transfer. For each interface, requests may be queued in both the MSU 10 and the TCM 12 waiting to transfer data and address information between the requesting units. The request selection and the control of the bi-directional interfaces 40 and 42 is performed by two distributed state machines 44 and 46 that are each located in part in the MSU 10, and in part in the TCM 12 (an ASIC located in the crossbar interconnect module). The address distributed state machine is contained in the MSU Control Algorithm (ALG) logic 48 and the TCM Control ALG logic 52, and the data distributed state machine is located in the MSU data control ALG logic 54 and the TCM data control ALG logic 50.

Both of the distributed state machines 44 and 46 are designed to provide control over the associated bi-directional interface 42 and 40, respectively, with a minimal amount of latency. To do this, each of the state machines 44 and 46 determines which way a set of tri-state drivers 56A, 56B and 58A, 58B for the associated interface 42 and 40 should be biased to anticipate the transfers that will be occurring next.

Figure 5:
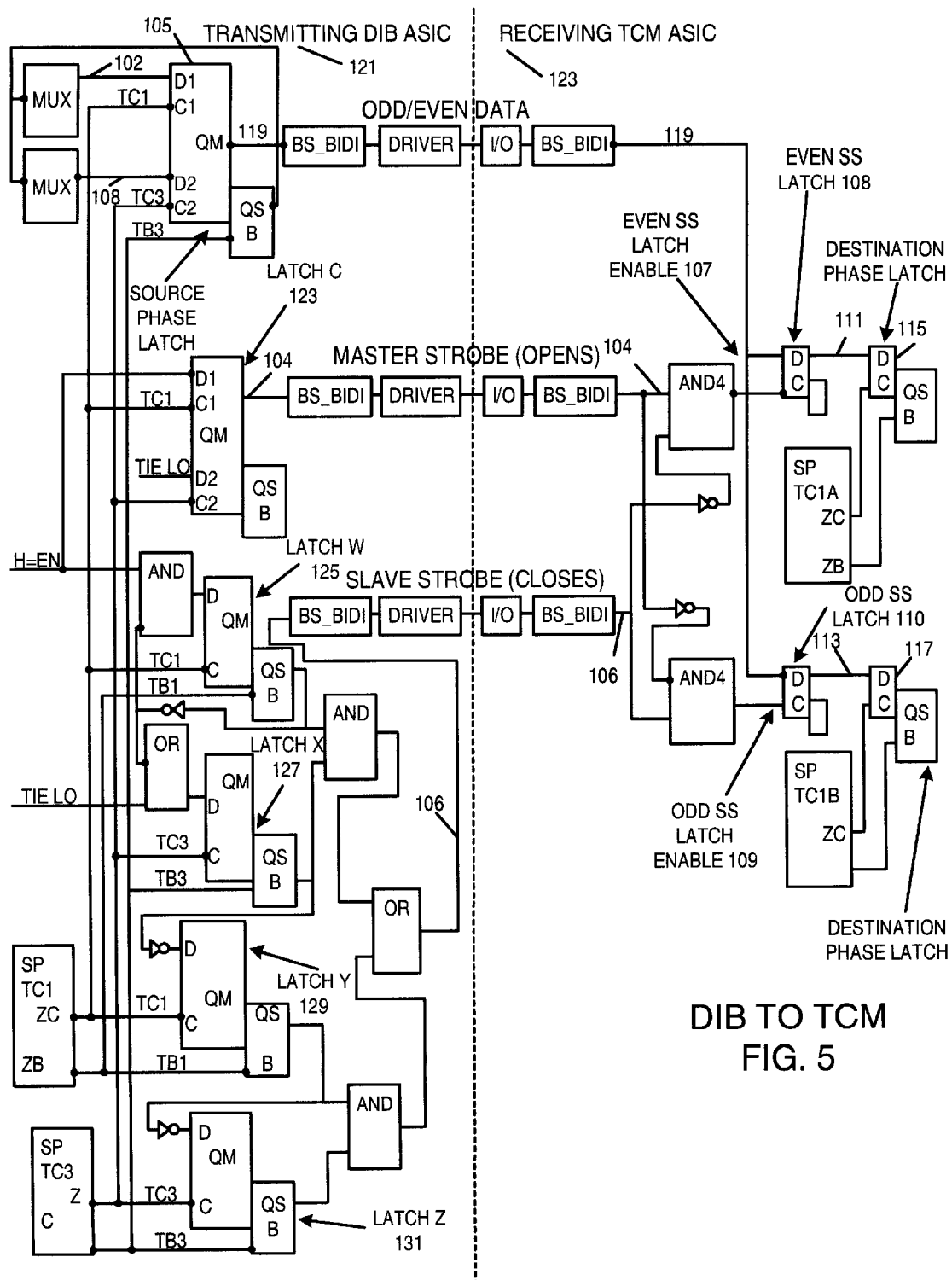
FIG. 5 is a block diagram of the DIB-to-TCM data transfer mechanism.

FIG. 5 is a block diagram of the DIB-to-TCM data transfer mechanism. The Unisys system contains three source synchronous interfaces which are identical except for the frequency of operation. The three interfaces are: the MI interface between the TCM and the MSU which operates at a 200 Mhz data rate, the MT interface between the TCM and the subpod which operates at a 133 Mhz data rate, and the MIO interface which operates with either the DIB at 100 Mhz data rate or with the Cluster at a 200 Mhz data rate. The detailed description that follows is for the TCM to DIB and TCM to Cluster bi-directional source synchronous interfaces.

The MIO data bus (FIG. 1A, element 22) is a source synchronous bi-directional bus design that operates at a 100 Mhz data rate between the DIB ASICs 121 and TCM ASICs 123. In general, the MIO bus interconnecting the DIB to the TCM (FIG. 1A, element 22) achieves the high data rate by time multiplexing two data groups (even 100 and odd 102) on the same bus with each group being transmitted at half the overall data rate.

In FIG. 5, two data groups 100 and 102 are passed on to the input of source phase latch 105. When source phase latch 105 is clocked, the multiplexed even/odd data group signal 119 is concurrently transmitted to the receiving TCM ASIC 123 on the data bus along with two strobe signals (master 104 and slave 106), which have low skew with respect to the two data groups 100 and 102. The master 104 and slave 106 strobe signals are logically combined in the receiving TCM ASIC to create even latch enable 107 and odd latch enable 109 signals that are used to latch the multiplexed data group signal 119 at the receiving TCM ASIC 123 in a set of flow through source synchronous latches (SS latches) 108 and 110. This pair of SS latches 108 and 110, one for even data 108 and one for odd data 110, de-multiplexes the data into even 111 and odd 113 data groups. The output of the SS latches (even 111 and odd 113 data groups) drive destination phase latches 115 and 117. The data transmission from the source phase latch 105 to the destination phase latches 115 and 117 must be completed in one clock cycle (2 clock phases) plus a clock pulse width.

Figure 6:
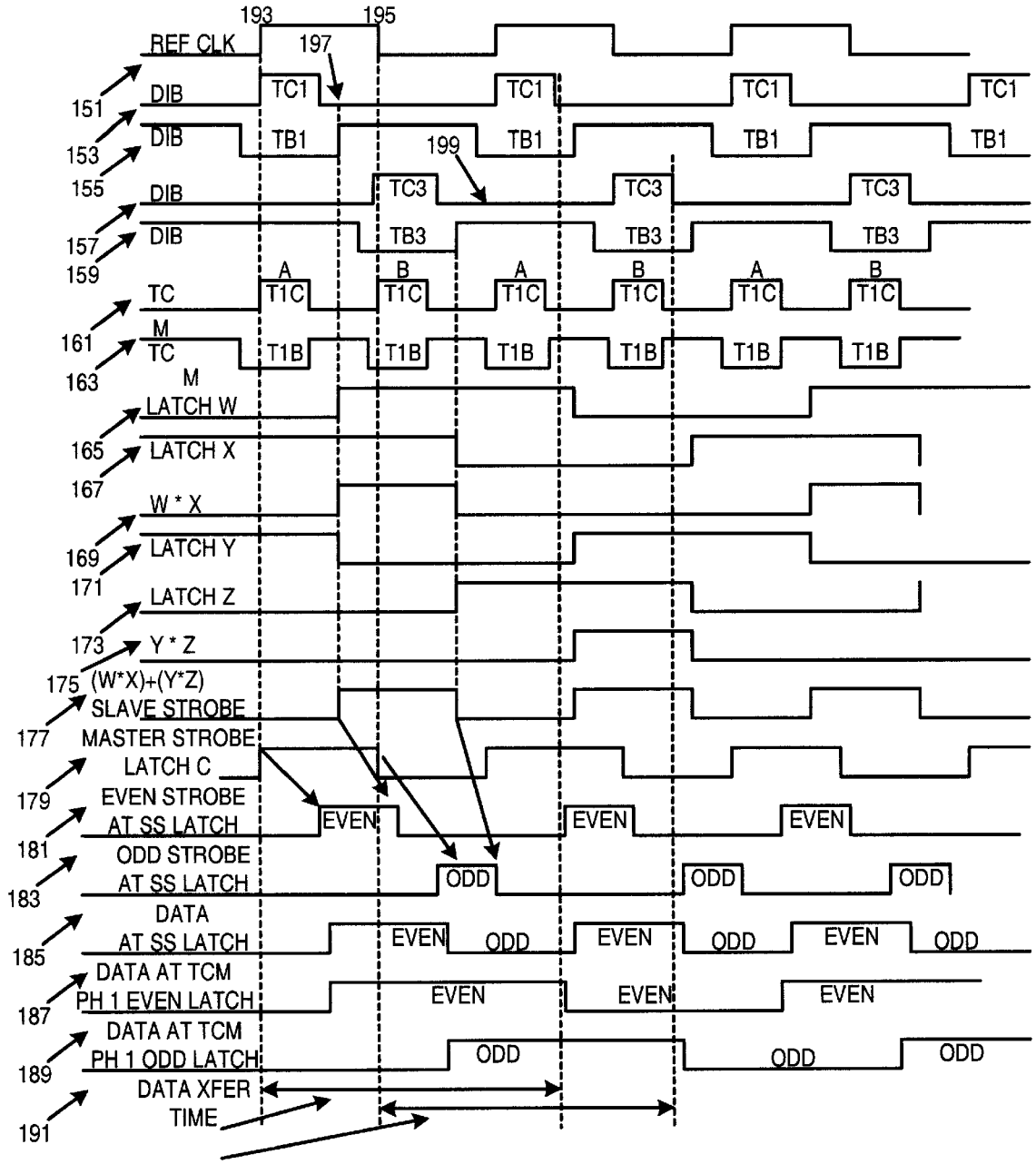
FIG. 6 illustrates a DIB-to-TCM timing diagram.

FIG. 6 illustrates a DIB-to-TCM timing diagram. Ref Clk (FIG. 6, element 151) is the timing pulse that synchronizes the system. The rising edge of the Ref Clk (FIG. 6, element 151) is aligned with the rising edge of all TC1 phases in the system. The Ref Clk (FIG. 6, element 151) is distributed with low skew to all ASICs and is used to generate all timing pulses in the system. The Ref Clk (FIG. 6, element 151) signal is also used to identify A and B phases where all A phases are associated with the rising edge of Ref Clk (FIG. 6, element 151) and all B phases are associated with the trailing edge of Ref Clk (FIG. 6, element 151), as an example refer to TCM TC1_A (FIG. 6, element 161) and TCM TC1_B (FIG. 6, element 161).

The even/odd data groups (FIG. 5, 100 and 102) are transmitted on the leading edge of DIB TC1 153 and DIB TC3 157, respectively. The leading edge of the master strobe signal 179 is associated with the leading edge of DIB TC1 153 (as shown at time 193) and the trailing edge of the master strobe 179 is associated with the leading edge of DIB TC3 157 (as shown at time 195). The leading edge of the slave strobe 177 is associated with the trailing edge of DIB TB1 155 (as shown at time 197) and the trailing edge of the slave strobe 177 is associated with the trailing edge of DIB TB3 159 (as shown at time 199)

The master and slave strobe signals 179 and 177 respectively, are designed to be low skew with respect to the data. The master strobe signal 179 is an output from latch C (FIG. 5, 123). The slave strobe signal 177 is logically derived from the outputs of latch W, latch X, latch Y, and latch Z (FIG. 5, latch elements 125, 127, 129 and 131 respectively). The latch W, X, Y and Z output signals 165, 167, 171 and 173, respectively, are logically combined (W AND X) OR (Y AND Z) to produce slave strobe signal 177. The master and slave strobes 179 and 177 are logically combined to create even 181 and odd 183 source synchronous (SS) latch enable signals. The leading edge of the SS latch enable signals 181 and 183 is timed to precede the data 185 and condition the SS latch (FIG. 5, 108 and 110) to the flow through state. The trailing edge of the latch signal 181 and 183 is designed to meet the setup and hold requirements for the SS latch (FIG. 5, 108 and 110). The trailing edge of the SS latch enable signal 181 and 183 closes the SS latch (FIG. 5, 108 and 110) and thus the SS latch only adds the delay of the latch to the path versus an edge trigger design which would add the delay of the latch, setup time to the latch and the skew of the strobe to data (an edge trigger design would reduce the maximum allowed data bus foil by about 5 inches). The even SS latch (FIG. 5, 108) feeds a phase TC2A (FIG. 5, 115) latch on the TCM end 123, and the odd SS latch (FIG. 5, 110) feeds a phase TC2B latch (FIG. 5, 117) on the TCM end 123. Using both edges of the master 179 and slave 177 strobes to generate the clock source for the source synchronous latches (FIG. 5, 108 and 110) ensures the pulse width of the clocking signals is insensitive to signal attenuation caused by the transmission environment.

The MIO data bus is a master-to-master transfer (SS latch is in flow through mode). The even and odd data groups must make the master-to-master transfer in its respective phase separation plus a phase pulse width (as shown at 191). TC1_A and TC1_B (FIG. 6, element 161) are used on the TCM to receive the source synchronous data (FIG. 5, element 111 and 113) from the DIB which runs at half of the speed of the TCM. The DIB transmits even and odd data (FIG. 5, element 119) on DIB TC1 (FIG. 6, 153) and DIB TC3 (FIG. 6, element 157) respectively. Since the DIB runs at half the speed of the TCM, the rising edge of TCM TC1_A (FIG. 6, element 161) aligns with the rising edge of DIB TC1 (FIG. 6, element 153) and the rising edge of TCM TC1_B (FIG. 6, element 161) aligns with the rising edge of DIB TC3 (FIG. 6, element 157). The capture time from the source latch (FIG. 7, element 205) to the destination latches (FIG. 7, elements 215 and 217) is from the leading edge of DIB TC1 to the trailing edge of TCM TC1_B. The hold time requirement for the receiving latches (FIG. 5, elements 115 and 117) is from the leading edge of DIB TC1 to the trailing edge of TCM TC1_A. The use of source synchronous latches in the present invention minimizes the hold time problems associated with master-to-master transfers.

The TCM/DIB data path will be managed to minimize the maximum delay and minimize the skew within a data group. The total MIO data bus foil (Mezzanine, back panel, and DIB board) will be routed to a minimum greater than 15 inches and a maximum of less than 33 inches. The minimum foil within a data group must be within 10 inches of the maximum foil.

The TCM/DIB data bus (FIG. 5, 119) will be partitioned into 18 bit data groups, with all bits in the group being sourced from the same clock splitter. The same clock splitter will be common with the associated master and slave strobe signals. On the receiving end, the source synchronous latch enable signals will be fanned out to groups of 9 bits. To ensure proper bus turn around, the last data transmission must be held on the bus until it is properly terminated to prevent reflection and ringing on the bus. This is accomplished by feeding the output data of the source phase latch (FIG. 5, 105) through a mux (FIG. 5, 103) into the source phase latch (FIG. 5, 105).

As mentioned earlier, there are two strobe signals per 18 data bits, a master strobe and a slave strobe signal. Clocking for the master and slave strobe signals will share common clock splitters with the data. The strobes will be independently adjusted for each data group. The adjustment of the strobe will be done by controlling the total length of the MIO bus strobe foil to an exact length on the Mezzanine, back panel, and the DIB boards. The master and slave strobe signals must be held in the inactive state (low) after the last data transmission until the signal is properly terminated.

Figure 7:
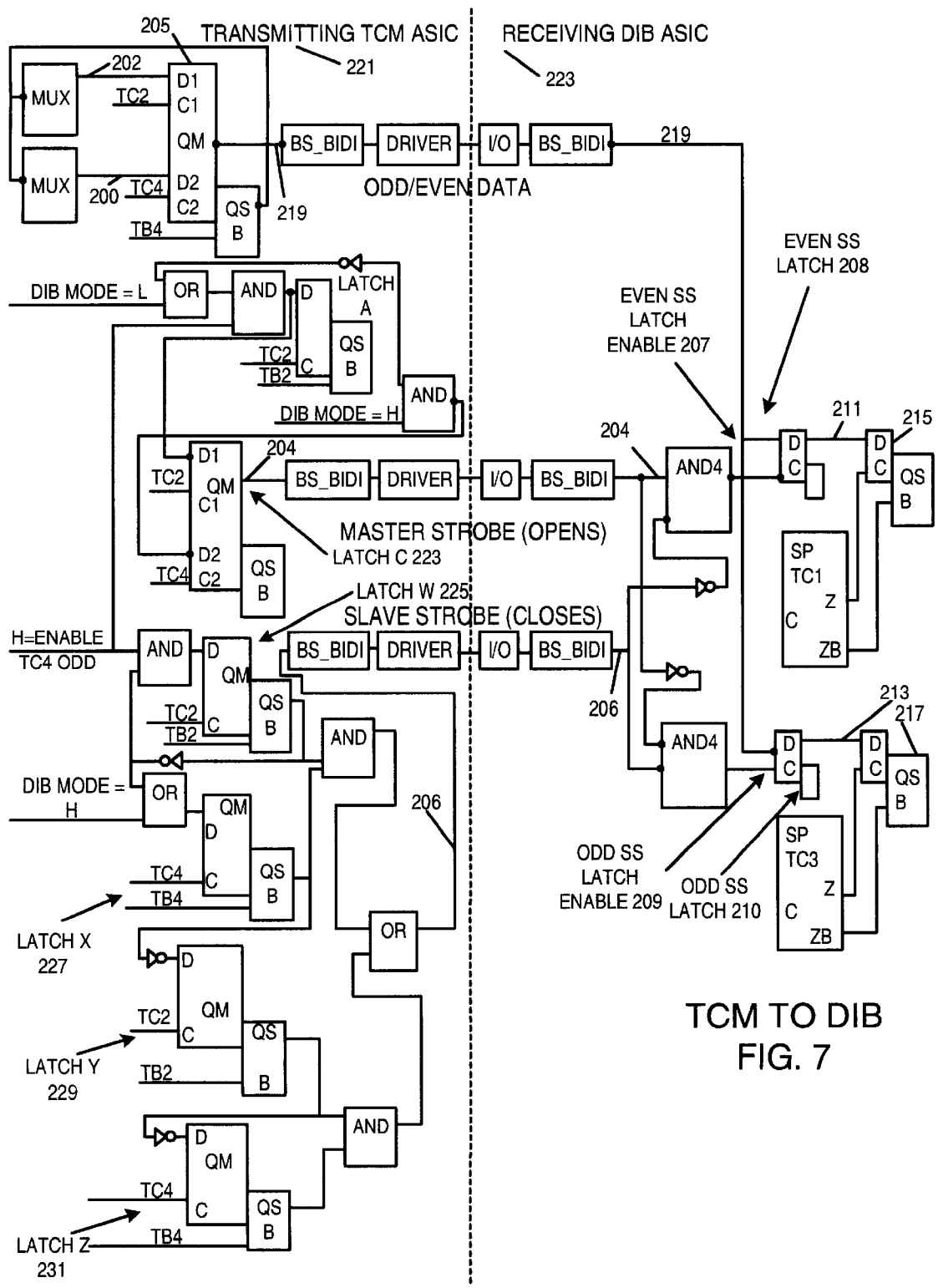
FIG. 7 is a block diagram of the TCM-to-DIB data transfer mechanism.
Figure 8:
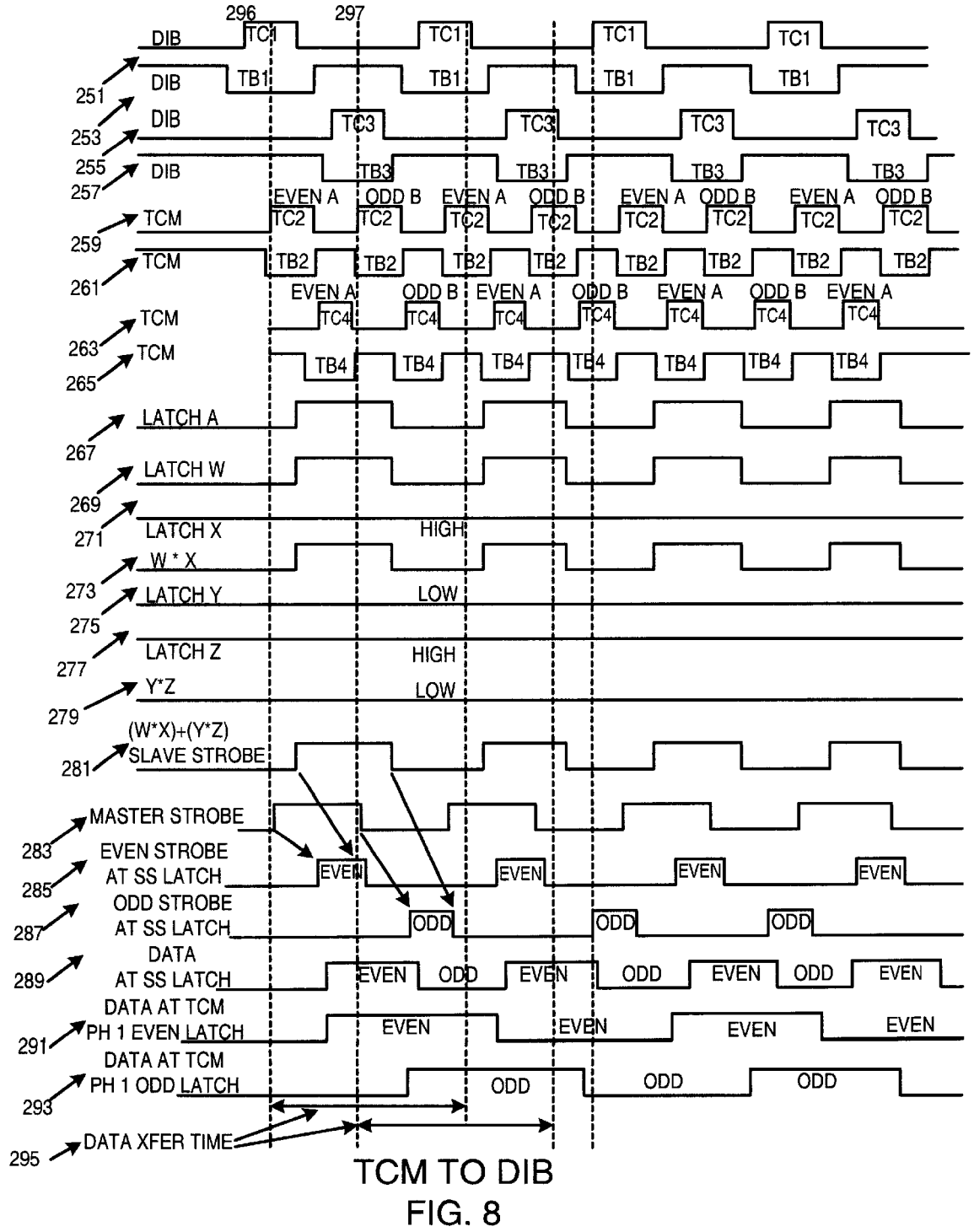
FIG. 8 illustrates a TCM-to-DIB timing diagram.

FIG. 7 is a block diagram of the TCM-to-DIB data transfer mechanism. The MIO data bus (FIG. 1A, element 22) is a source synchronous bi-directional bus design that operates at a 100 Mhz data rate between the TCM ASICs 221 and DIB ASICs 223. The source synchronous circuitry in the TCM is designed to operate at either 100 Mhz for the DIB interface or 200 Mhz data rate for the Cluster interface. TAP control logic conditions the TCM strobe logic (FIG. 7, DIB MODE=L (element 235) and DIB MODE=H (element 237)) for either the DIB interface at a 100 Mhz data rate or for the Cluster interface at a 200 Mhz data rate. FIG. 7 shows the TCM conditioned for the DIB interface. In general, the TCM 221 which cycles at twice the rate of the DIB 223 transmits data 202 on the bus 219 ever TCM TC2 (FIG. 8, element 259). The even data is transmitted on the TCM TC2_A and the odd data is transmitted on the TCM TC2_B. The data 200 is the same as data 202 and is re-clocked into the source phase latch (FIG. 5, element 105) with TCM TC4 (FIG. 8, 263) in order to match the clock rate of the DIB which is half that of the TCM.

In FIG. 7, data groups 200 and 202 (same data) are passed on to the input of source phase latch 205. When source phase latch 205 is clocked, the multiplexed even/odd data group signal 219 is concurrently transmitted to the receiving DIB ASIC 223 on the data bus along with two strobe signals (master 204 and slave 206), which have low skew with respect to the two data groups. The master 204 and slave 206 strobe signals are logically combined in the receiving DIB ASIC 223 to create even latch enable 207 and odd latch enable 209 signals that are used to latch the multiplexed data group signal 219 at the receiving DIB ASIC 223 in a set of flow through source synchronous latches (SS latches) 208 and 210. This pair of SS latches 208 and 210, one for even data 208 and one for odd data 210, de-multiplexes the data into even 211 and odd 213 data groups. The output of the SS latches (even 211 and odd 213 data groups) drive destination phase latches 215 and 217. The data transmission from the source phase latch 205 to the destination phase latches 215 and 217 must be completed in the equivalent of one TCM clock cycle (TC1 to TC1) plus a TCM TC1 clock pulse width.

FIG. 8 illustrates a TCM-to-DIB timing diagram. The even/odd data groups are transmitted on the leading edge of TCM TC2A (even) and TC2B (odd) 259. The leading edge of the master strobe signal 283 is associated with the leading edge of TCM TC2A (even) 259 (as shown at 296) and the trailing edge of the master strobe 283 is associated with the leading edge of TCM TC2B (odd) 259 (as shown at time 297). The leading edge of the slave strobe 281 is associated with the rising edge of TCM TB2A (even) 261 and the trailing edge of the slave strobe 281 is associated with the trailing edge of TCM TB2B (odd) 261.

The master and slave strobe signals 283 and 281 respectively, are designed to be low skew with respect to the data. The master strobe signal 283 is an output from latch C (FIG. 7, 223). The slave strobe signal 281 is logically derived from the outputs of latch W, latch X, latch Y, and latch Z (FIG. 7, latch elements 225, 227, 229 and 231 respectively). The latch W, X, Y and Z output signals 269, 271, 275 and 277, respectively, are logically combined (W AND X) OR (Y AND Z) to produce slave strobe signal 281. The master and slave strobes 283 and 281 are logically combined to create even 285 and odd 287 source synchronous (SS) latch enable signals. The leading edge of the SS latch enable signals 285 and 287 is timed to precede the data and condition the SS latch (FIG. 7, 208 and 210) to the flow through state. The trailing edge of the latch signal 285 and 287 is designed to meet the setup and hold requirements for the SS latch (FIG. 7, 208 and 210). The trailing edge of the SS latch enable signal 285 and 287 closes the SS latch (FIG. 7, 208 and 210) and thus the SS latch only adds the delay of the latch to the path versus an edge trigger design which would add the delay of the latch, setup time to the latch and the skew of the strobe to data (an edge trigger design would reduce the maximum allowed data bus foil by about 5 inches). The even SS latch (FIG. 7, 208) feeds a phase latch (FIG. 7, 215) on the DIB end 223, and the odd SS latch (FIG. 7, 210) feeds a phase latch (FIG. 7, 217) on the DIB end 223. Using both edges of the master 283 and slave 281 strobes to generate the clock source for the source synchronous latches (FIG. 7, 208 and 210) ensures the pulse width of the clocking signals is insensitive to signal attenuation caused by the transmission environment.

Figure 9:
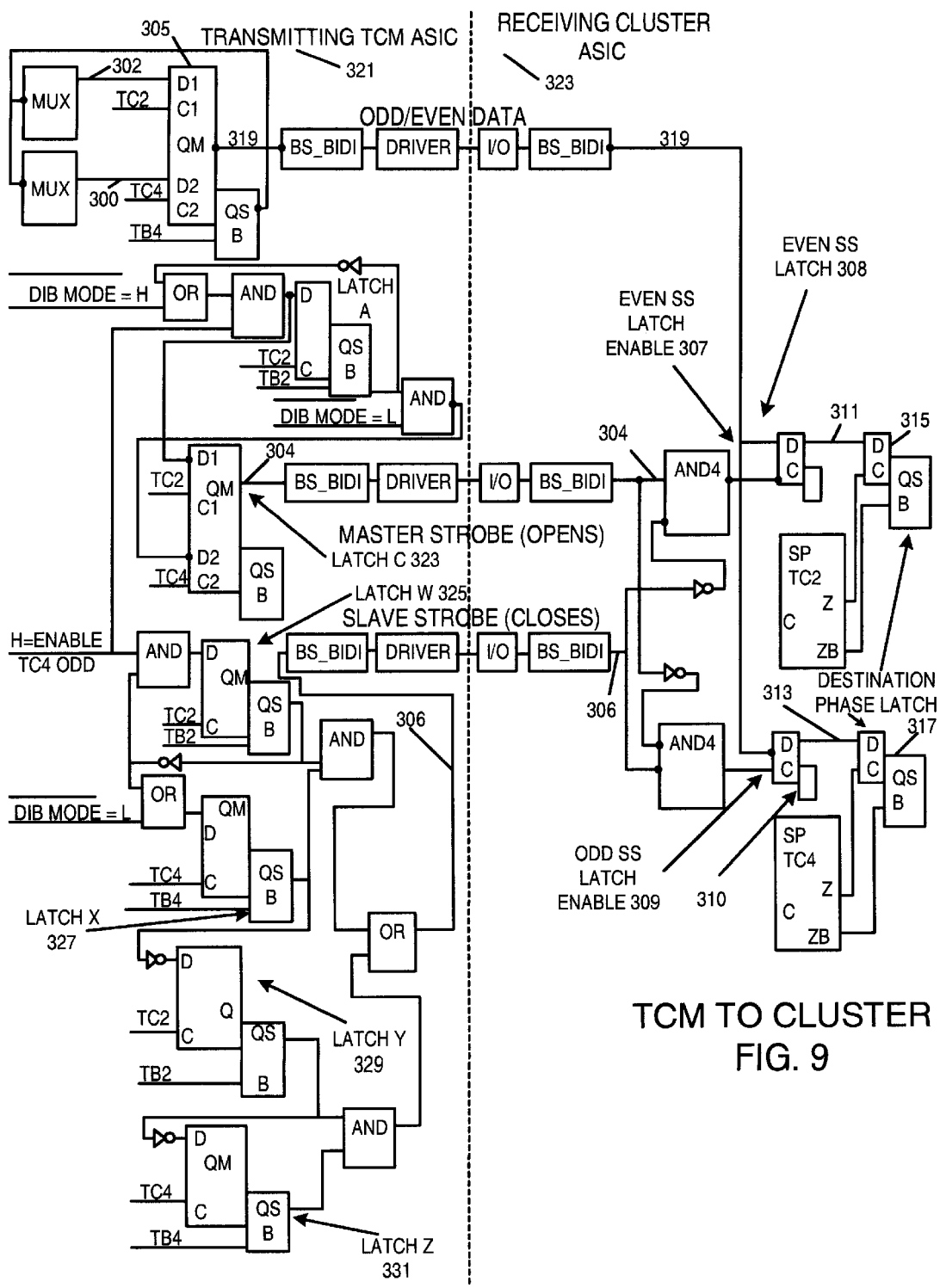
FIG. 9 is a block diagram of the TCM-to-Cluster ASIC data transfer mechanism.

FIG. 9 is a block diagram of the TCM-to-Cluster ASIC data transfer mechanism. The MIO data bus between the TCM 321 and the Cluster ASICs (FIG. 1A, element 22) is a source synchronous bi-directional bus design that operates at a 200 MHz data rate. The source synchronous circuitry in the TCM is designed to operate at either 100 Mhz for the DIB interface or a 200 Mhz data rate for the Cluster interface. TAP control logic conditions the TCM strobe logic (FIG. 9, NOT DIB MODE=H (element 337) and NOT DIB MODE=L (element 339)) for either the DIB interface at a 100 Mhz data rate or for the Cluster interface at a 200 Mhz data rate. FIG. 9 shows the TCM conditioned for the Cluster interface. In general, the MIO bus interconnecting the TCM to the Cluster ASICs (FIG. 1A, element 22) achieves the high data rate by time multiplexing two data groups (even 300 and odd 302) on the same bus 319 with each group being transmitted at half the overall data rate.

In FIG. 9, two data groups 300 and 302 are passed on to the input of source phase latch 305. When source phase latch 305 is clocked, the multiplexed even/odd data group signal 319 is concurrently transmitted to the receiving Cluster ASIC 323 on the data bus along with two strobe signals (master 304 and slave 306), which have low skew with respect to the two data groups 300 and 302. The master 304 and slave 306 strobe signals are logically combined in the receiving Cluster ASIC 323 to create even latch enable 307 and odd latch enable 309 signals that are used to latch the multiplexed data group signal 319 at the receiving Cluster ASIC 323 in a set of flow through source synchronous latches (SS latches) 308 and 310. This pair of SS latches 308 and 310, one for even data 308 and one for odd data 310, de-multiplexes the data into even 311 and odd 313 data groups. The output of the SS latches (even 311 and odd 313 data groups) drive destination phase latches 315 and 317. The data transmission from the source phase latch 305 to the destination phase latches 315 and 317 must be completed in one phase separation plus a clock pulse width.

Figure 10:
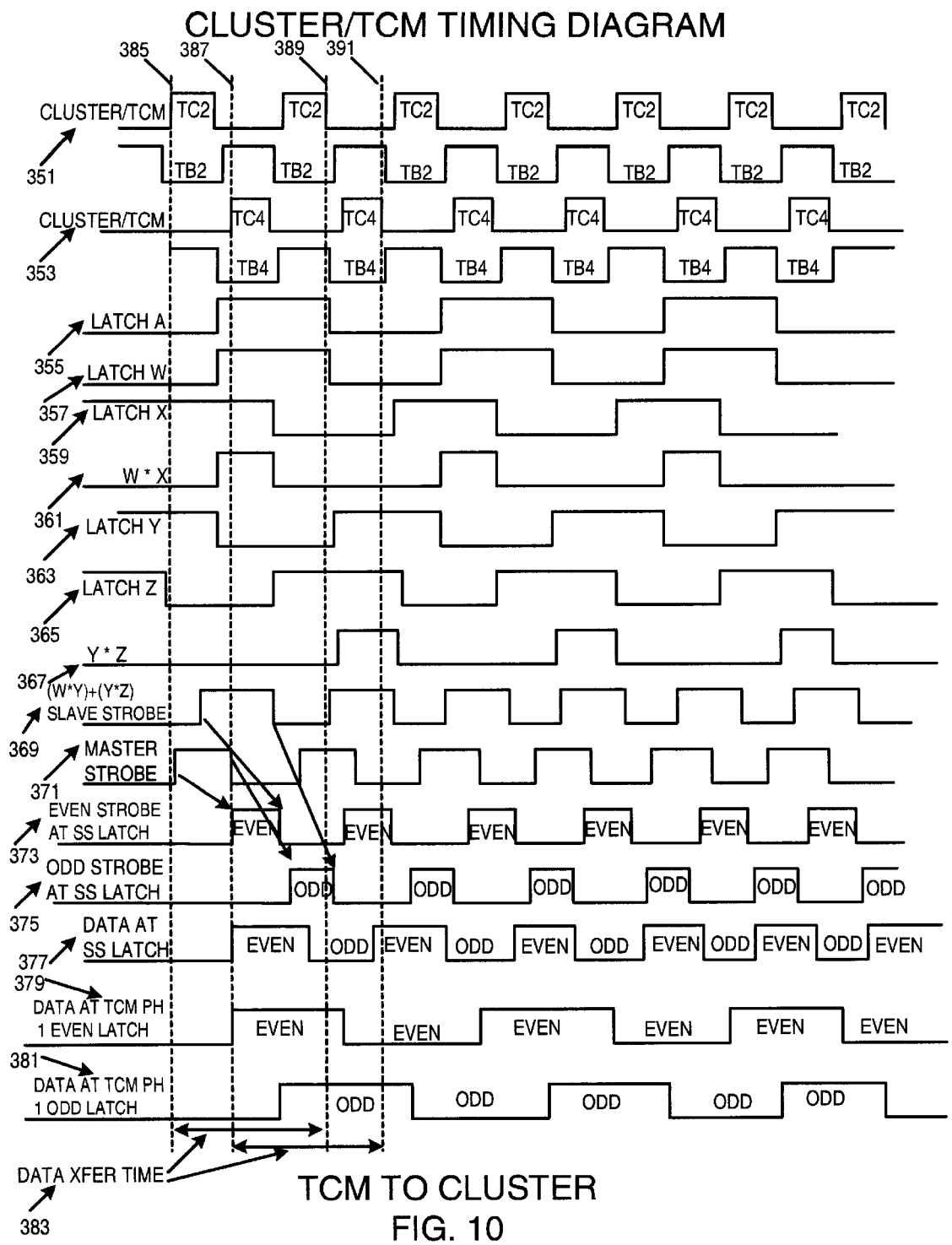
FIG. 10 illustrates a TCM-to-Cluster timing diagram.

FIG. 10 illustrates a TCM-to-Cluster timing diagram. The leading edge of the master strobe signal 371 is associated with the leading edge of TCM TC2 351 (as shown at time 385) and the trailing edge of the master strobe 371 is associated with the leading edge of TCM TC4 353 (as shown at time 387). The leading edge of the slave strobe 369 is associated with the trailing edge of TCM TB2 351 (as shown at time 389) and the trailing edge of the slave strobe 369 is associated with the trailing edge of TCM TB4 353 (as shown at time 391)

The master and slave strobe signals 371 and 369 respectively, are designed to be low skew with respect to the data. The master strobe signal 371 is an output from latch C (FIG. 9, 323). The slave strobe signal 369 is logically derived from the outputs of latch W, latch X, latch Y, and latch Z (FIG. 9, latch elements 325, 327, 329 and 331 respectively). The latch W, X, Y and Z output signals 357, 359, 363 and 365, respectively, are logically combined (W AND X) OR (Y AND Z) to produce slave strobe signal 369. The master and slave strobes 371 and 369 are logically combined to create even 373 and odd 375 source synchronous (SS) latch enable signals. The leading edge of the SS latch enable signals 373 and 375 is timed to precede the data and condition the SS latch (FIG. 9, 308 and 310) to the flow through state. The trailing edge of the latch enable signal 373 and 375 is designed to meet the setup and hold requirements for the SS latch (FIG. 9, 308 and 310). The trailing edge of the SS latch enable signal 373 and 375 closes the SS latch (FIG. 9, 308 and 310) and thus the SS latch only adds the delay of the latch to the path versus an edge trigger design which would add the delay of the latch, setup time to the latch and the skew of the strobe to data (an edge trigger design would reduce the maximum allowed data bus foil by about 5 inches). The even SS latch (FIG. 9, 308) feeds a destination phase latch (FIG. 9, 315) on the Cluster ASIC end 323, and the odd SS latch (FIG. 9, 310) feeds a destination phase latch (FIG. 9, 317) on the Cluster ASIC end 323. Using both edges of the master 371 and slave 369 strobes to generate the clock source for the source synchronous latches (FIG. 9, 308 and 310) ensures the pulse width of the clocking signals is insensitive to signal attenuation caused by the transmission environment.

Figure 11:
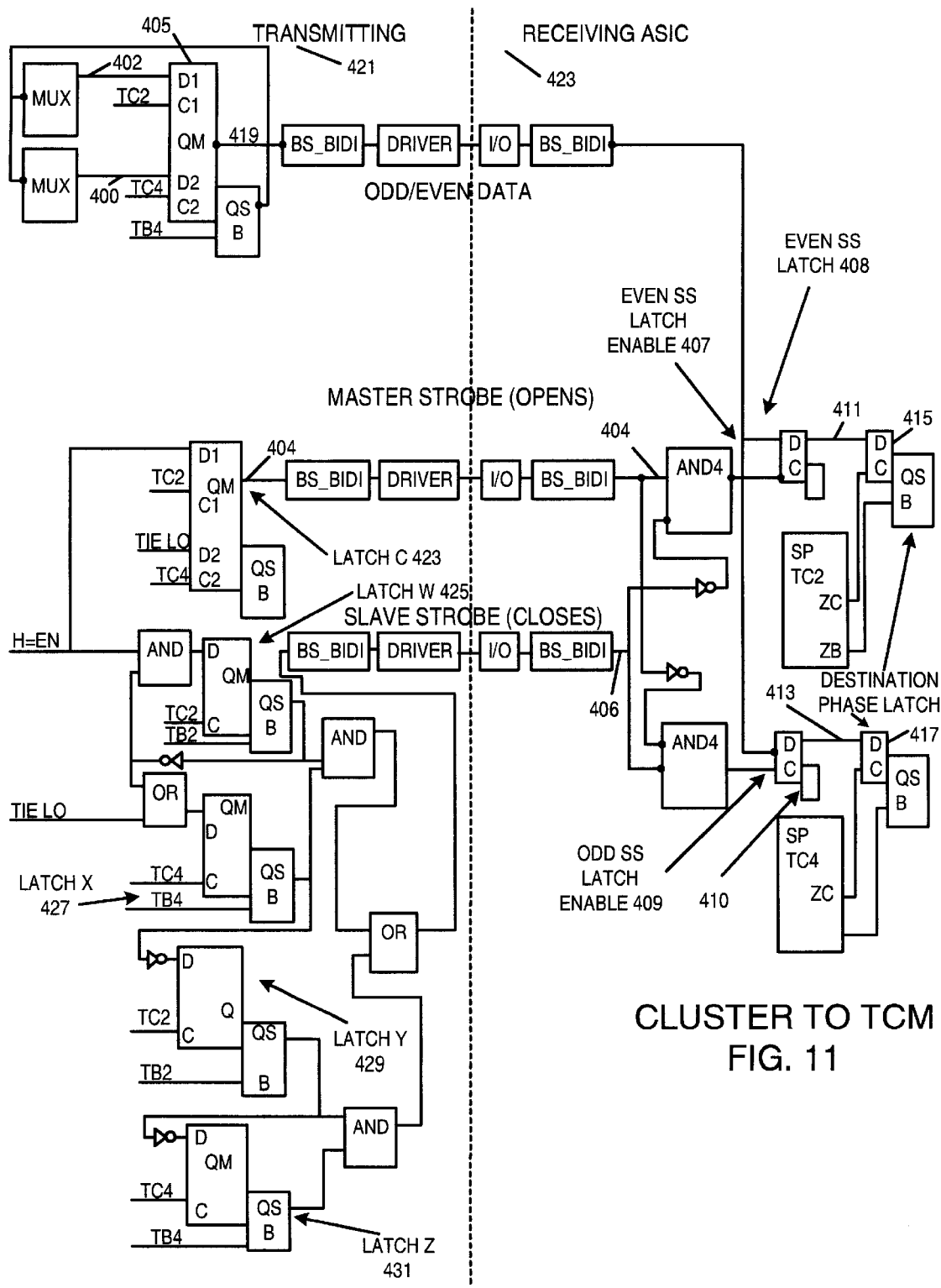
FIG. 11 is a block diagram of the Cluster ASIC-TCM data transfer mechanism.

FIG. 11 is a block diagram of the Cluster ASIC-to-TCM data transfer mechanism. The MIO data bus between the Cluster ASIC 421 and the TCM 423 (FIG. 1A, element 18) is a source synchronous bi-directional bus design that operates at a 200 Mhz data rate. In general, the MIO bus interconnecting the Cluster ASICs to the TCM (FIG. 1A, element 18) achieves the high data rate by time multiplexing two data groups (even 400 and odd 402) on the same bus with each group being transmitted at half the overall data rate.

In FIG. 11, two data groups 400 and 402 are passed on to the input of source phase latch 405. When source phase latch 405 is clocked, the multiplexed even/odd data group signal 419 is concurrently transmitted to the receiving TCM ASIC 423 on the data bus along with two strobe signals (master 404 and slave 406), which have low skew with respect to the two data groups 400 and 402. The master 404 and slave 406 strobe signals are logically combined in the receiving TCM 423 to create even latch enable 407 and odd latch enable 409 signals that are used to latch the multiplexed data group signal 419 at the receiving TCM ASIC 423 in a set of flow through source synchronous latches (SS latches) 408 and 410. This pair of SS latches 408 and 410, one for even data 408 and one for odd data 410, de-multiplexes the data into even 411 and odd 413 data groups. The output of the SS latches (even 411 and odd 413 data groups) drive destination phase latches 415 and 417. The data transmission from the source phase latch 405 to the destination phase latches 415 and 417 must be completed in one same phase separation plus a clock pulse width.

Having thus described the preferred embodiments of the present invention, those of skill in the art will readily appreciate that the teachings found herein may be applied to yet other embodiments within the scope of the claims hereto attached.

What is claimed is:

1. In a general purpose digital computer apparatus having at least two system components interconnected by at least one point-to-point bi-directional interface, the improvement comprising:

means coupled to at least two of the system components for increasing a transfer rate between said system components through the use of multi-phase data transfers on a single clock cycle.

2. An improvement according to claim 1 wherein said means for increasing the transfer rate further comprises a source synchronous transfer means.

3. An improvement according to claim 1 wherein said means increases the transfer rate of the interface by multiplexing two data groups on the same bus with each said group being transmitted at half the overall data rate.

4. An improvement according to claim 3 wherein said data groups are transmitted from a source phase latch at approximately the same time as two strobe signals which have low skew with respect to the data.

5. An improvement according to claim 4 wherein said two strobe signals comprise a master strobe signal and a slave strobe signal.

6. An improvement according to claim 5 wherein said strobe signals is independently adjusted for each data group.

7. An improvement according to claim 6 wherein the adjustment of said strobe signals will be done by controlling the total length of a bus strobe foil located within the digital computer.

8. An improvement according to claim 5 wherein said strobe signals are logically combined to create an even latch enable signal and an odd latch enable signal that are used to latch said multiplexed data groups at a receiving end of a pair of flow-through source synchronous latches.

9. An improvement according to claim 8 wherein the leading edge of the master strobe signal generates the leading edge of the even source synchronous latch enable signal.

10. An improvement according to claim 8 wherein the leading edge of the slave strobe signal generates the trailing edge of the even source synchronous latch enable signal.

11. An improvement according to claim 8 wherein the trailing edge of the master strobe signal generates the leading edge of the odd source synchronous latch enable signal.

12. An improvement according to claim 8 wherein the trailing edge of the slave strobe signal generates the trailing edge of the odd source synchronous latch enable signal.

13. An improvement according to claim 5 wherein a pair of source synchronous latches de-multiplexes said multiplexed data groups.

14. An improvement according to claim 5 wherein leading edges of said master strobe signal and said slave strobe signal are timed to precede the data and condition the source synchronous latch to the flow-through state.

15. An improvement according to claim 14 wherein trailing edges of said master strobe signal and said slave strobe signal are timed to close the source synchronous latch to the flow-through state.

16. An improvement according to claim 15 wherein using said master strobe signal leading edge and said slave strobe signal leading edge to generate a latch enable signal and using said master strobe trailing edge and said slave strobe trailing edge to generate a latch enable signal for the source synchronous latches ensures that the latch signal pulse widths are insensitive to signal attenuation caused by the transmission environment.

17. An improvement according to claim 13 wherein outputs from said pair of source synchronous latches drives a set of destination phase latches.

18. An improvement according to claim 17 wherein a data transmission from the source phase latch to a destination phase latch must be completed in one clock cycle plus a clock pulse width.

19. An improvement according to claim 18 wherein clocking for the master and slave strobe signals shares common clock splitters with the data to minimize skew.

20. An improvement according to claim 17 wherein a last data transmission must be held on the bus until it is properly terminated to ensure proper bus turnaround.

21. An improvement according to claim 17 wherein the master and slave strobe signals must be held in the inactive state after the last data transmission until the signal is properly terminated to ensure proper bus turnaround.

22. An apparatus for source synchronous transfer of data in a general purpose computer system comprising:

a. at least two system components;

b. at least one point-to-point bi-directional interface connecting said components;

c. a clock signal operating at a fixed cycle time on said bi-directional interface;

d. a controller which increases a transfer rate between said system components through the use of multi-phase data transfers on a single clock cycle.

23. An apparatus according to claim 22 wherein said source synchronous transfer apparatus increases the transfer rate of the interface by multiplexing two data groups on the same bus with each said group being transmitted at half the overall data rate.

24. An apparatus according to claim 23 wherein said data groups are transmitted from a source phase latch at approximately the same time as two strobe signals which have low skew with respect to the data.

25. An apparatus according to claim 24 wherein said two strobe signals comprise a master strobe signal and a slave strobe signal.

26. An apparatus according to claim 25 wherein said strobe signals is independently adjusted for each data group.

27. An apparatus according to claim 25 wherein said strobe signals are logically combined to create an even latch enable signals and an odd latch enable signal that are used to latch said multiplexed data groups at a receiving end of a pair of flow-through source synchronous latches.

28. An apparatus according to claim 27 wherein the leading edge of the master strobe signal generates the leading edge of the even source synchronous latch enable signal.

29. An apparatus according to claim 27 wherein the leading edge of the slave strobe signal generate the trailing edge of the even source synchronous latch enable signal.

30. An apparatus according to claim 27 wherein the trailing edge of the master strobe signal generates the leading edge of the odd source synchronous latch enable signal.

31. An apparatus according to claim 27 wherein the trailing edge of the slave strobe signal generates the trailing edge of the odd source synchronous latch enable signal.

32. An apparatus according to claim 23 wherein a pair of source synchronous latches de-multiplexes said multiplexed data groups.

33. An apparatus for source synchronous transfer of data in a general purpose computer system comprising:
   a. at least two system components;
   b. at least one point-to-point bi-directional interface connecting said components;
   c. a clock signal operating at a fixed cycle time on said bi-directional interface;
   d. a controller which transmits two multiplexed data group signals with an associated set of even and an odd latch enable signals during each clock cycle on said interface such that a leading and a trailing edge of each said even and odd latch enable signal triggers a pair of flow-through source synchronous latches on a receiving end of said interface to de-multiplex said multiplexed data group signals into an even and an odd data group signal.

34. An apparatus according to claim 33 wherein a leading edge of said latch enable signal is timed to precede the data and condition said source synchronous latches to the flow-through state.

35. An apparatus according to claim 34 wherein a trailing end of said latch enable signal is timed to close said source synchronous latches to the flow-through state.

36. A method for increasing the transfer rate on a point-to-point bi-directional interface through the use of multi-phase data transfers on a single clock cycle comprising:
   a. multiplexing two data groups on said interface with each said group being transmitted at half the overall data rate;
   b. generating a master and a slave strobe signal which have low skew with respect to the data;
   c. combining said master and said slave strobe signals to create an even latch enable signal and an odd latch enable signal which are used to latch said multiplexed data groups at a receiving end of a pair of flow-through source synchronous latches; and
   d. de-multiplexing said multiplexed data groups into an even and an odd data group at said pair of flow-through source synchronous latches such that said even and odd data groups drive a set of destination phase latches.

37. A method according to claim 36 wherein a leading edge of the master strobe signal generate the leading edge of the even source synchronous latch enable signal.

38. A method according to claim 36 wherein the leading edge of the slave strobe signal generate the trailing edge of the even source synchronous latch enable signal.

39. A method according to claim 36 wherein the trailing edge of the master strobe signal generate the leading edge of the odd source synchronous latch enable signal.

40. A method according to claim 36 wherein the trailing edge of the slave strobe signal generates the trailing edge of the odd source synchronous latch enable signal.

* * * * *

UNITED STATES PATENT AND TRADEMARK OFFICE
CERTIFICATE OF CORRECTION

PATENT NO. : 6,199,135 B1
DATED : March 6, 2001
INVENTOR(S) : Maahs et al.

It is certified that error appears in the above-identified patent and that said Letters Patent is hereby corrected as shown below:

Column 11,
Line 30, thereof, delete "is" and insert therefor, -- are --.

Column 12,
Line 45, thereof, delete "is" and insert therefor, -- are --.

Signed and Sealed this

Ninth Day of July, 2002

*Attest:*

JAMES E. ROGAN
*Director of the United States Patent and Trademark Office*

*Attesting Officer*